United States Patent
Dinc et al.

(10) Patent No.: US 6,250,641 B1
(45) Date of Patent: *Jun. 26, 2001

(54) POSITIVE BIASED PACKING RING BRUSH SEAL COMBINATION

(75) Inventors: Osman Saim Dinc, Troy; Norman Arnold Turnquist, Cobleskill; Robert Harold Cromer, Johnstown; George Ernest Reluzco, Schenectady; Christopher Edward Wolfe, Niskayuna, all of NY (US)

(73) Assignee: General Electric Co., Schenectady, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/199,730

(22) Filed: Nov. 25, 1998

(51) Int. Cl.[7] .................................................. F16J 15/447
(52) U.S. Cl. ............................ 277/355; 277/413; 277/422
(58) Field of Search ........................................ 277/355, 413, 277/416, 420, 421, 422

(56) References Cited

U.S. PATENT DOCUMENTS

| 3,594,010 | * | 7/1971 | Warth | 277/413 |
| 5,106,104 | | 4/1992 | Atkinson et al. | |
| 5,374,068 | | 12/1994 | Jewett et al. | |
| 5,603,510 | * | 2/1997 | Sanders | 277/413 |
| 5,630,590 | | 5/1997 | Bouchard et al. | |
| 5,749,584 | | 5/1998 | Skinner et al. | |
| 6,027,121 | * | 2/2000 | Cromer et al. | 277/355 |
| 6,045,134 | * | 4/2000 | Turnquist et al. | 277/355 |
| 6,065,754 | * | 5/2000 | Cromer et al. | 277/413 |

FOREIGN PATENT DOCUMENTS

| 2 301 635 | * | 12/1996 | (GB) . |
| WO 92/05378 | | 4/1992 | (WO) . |

* cited by examiner

Primary Examiner—James R. Brittain
Assistant Examiner—John L. Beres
(74) Attorney, Agent, or Firm—Nixon & Vanderhye

(57) ABSTRACT

Circumferentially extending sealing segments (45) are disposed about a rotary component (16) and have seal face (34) carrying a plurality of labyrinth seal teeth (36) and a brush seal (37). The segments are movable between large and small clearance positions relative to the rotor at start-up and steady-state operating conditions, respectively. In one form, springs (31) bias the segments radially outwardly at start-up and steam pressure displaces the segments to the small clearance positions at steady-state operations. In a further embodiment, springs bias the segment for movement to the small clearance position, the extent of movement being determined by thermal expansion of centering rings mounting the segments to the stationary components.

13 Claims, 7 Drawing Sheets

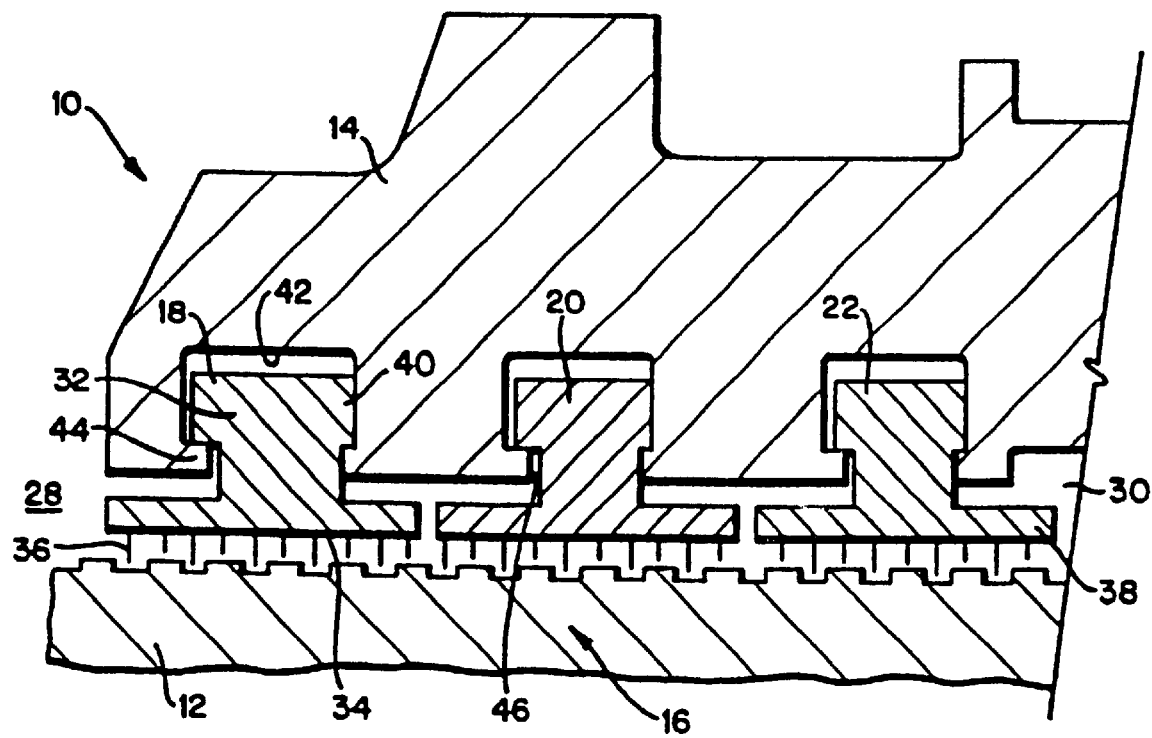

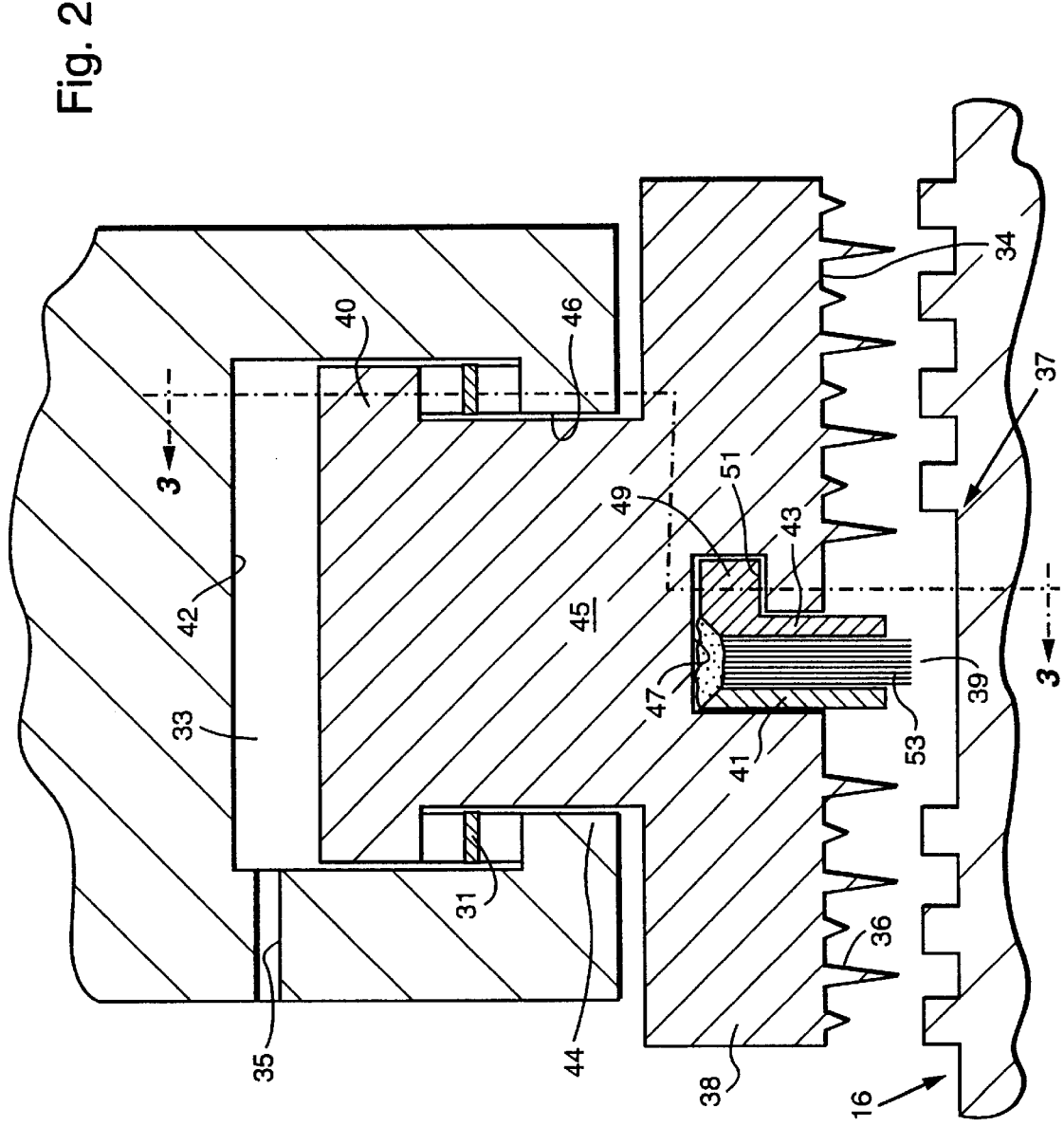

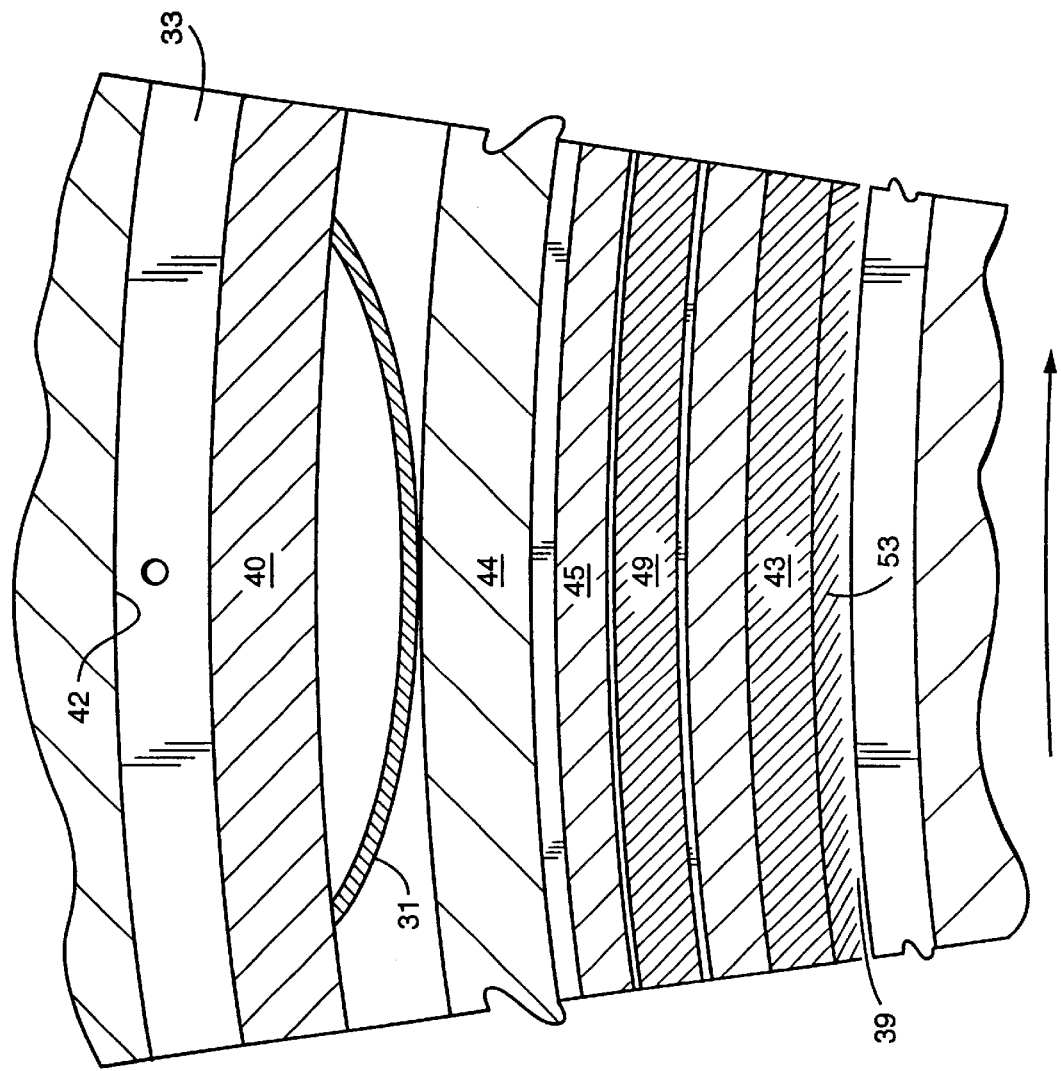

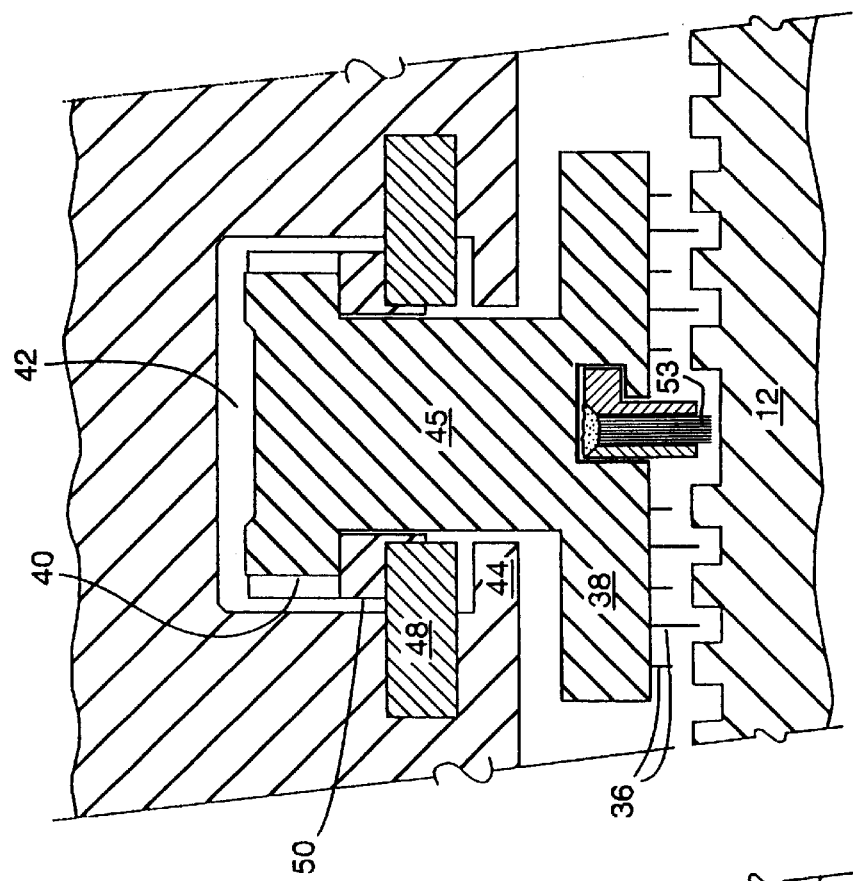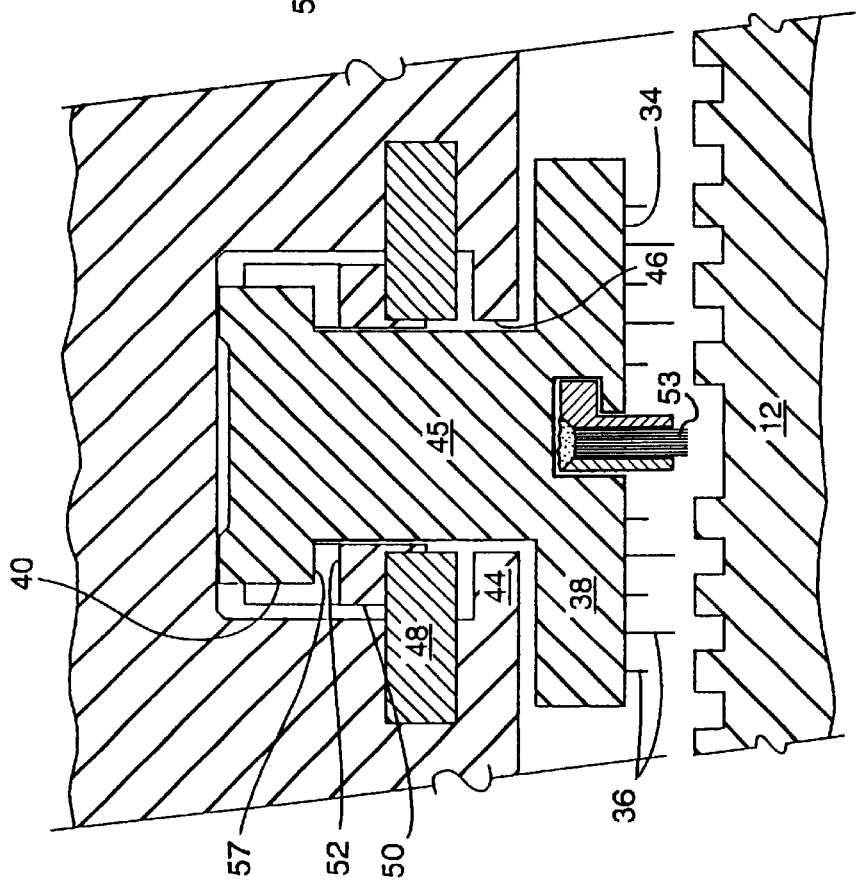

US 6,250,641 B1

POSITIVE BIASED PACKING RING BRUSH SEAL COMBINATION

TECHNICAL FIELD

The present invention relates to seals between rotating and stationary components of a machine, for example, a steam turbine, and particularly relates to combined labyrinth/brush seal packing ring segments positively biased for movement between large seal clearance start-up and small seal clearance steady-state operating positions about a rotary component.

BACKGROUND OF THE INVENTION

In many machines, seals are provided between rotating and stationary components. For example, in steam turbines, it is customary to employ a plurality of arcuate seal ring segments to form a labyrinth seal about and between the stationary and rotating components. Typically, the arcuate seal ring segments are disposed in an annular groove in the stationary component designed to be concentric about the axis of rotation of the machine and hence concentric to the sealing surface of the rotating component. Each arcuate seal segment carries an arcuate seal face in opposition to the sealing surface of the rotating component. In labyrinth-type seals, the seal faces carry a radially directed array of axially spaced teeth and which teeth are radially spaced from an array of axially spaced annular grooves forming the sealing surface of the rotating component. Alternatively, the rotating component may have a smooth surface in radial opposition to the array of teeth on the seal faces. In any event, the sealing function is achieved by creating turbulent flow of a working media, for example, steam, as it passes through the relatively tight clearances within the labyrinth defined by the seal face teeth and the opposing surface of the rotating component. As a further alternative, a combined labyrinth/brush seal configuration may be used as part of the sealing faces of the segments. The primary seal is therefore accomplished by the brush seal, with the labyrinth teeth serving as back-up seals in the event of a failure of the brush seal.

In a typical installation, the annular groove of the stationary component is dovetail-shaped, having locating flanges directed axially toward one another and defining a slot therebetween. The stationary component is split lengthwise such that the semi-annular dovetail grooves may receive generally correspondingly shaped arcuate seal ring segments. More particularly, the arcuate segments are similarly dovetail-shaped, having a pair of flanges directed axially away from one another for disposition within the dovetail groove and a neck joining the seal face and the flanges of the segment and passing through the slot defined by the locating flanges of the groove. The neck carries the arcuate seal face radially inwardly of the groove when installed.

In this type of seal, the ability to maintain a tight uniform clearance without physical contact between the rotating and stationary components is critical to the formation of an effective seal. If this radial clearance between the seal faces of the segments and the opposing seal surface of the rotating component becomes too large, less turbulence is produced and the sealing action is compromised. Conversely, if the clearance is too tight, the sealing teeth may contact the rotating element, with the result that the teeth lose their profile and tight clearance and thereafter create less turbulence, likewise compromising the sealing action.

Current variable clearance packing rings often use high pressure steam to overcome a radially outwardly directed spring force and move the packing ring segments radially inwardly toward the rotor after start-up. That is, at start-up, the springs locate the packing ring segments in a radially outermost position, affording a large clearance between the sealing faces of the segments and the rotor to accommodate relative movement of the rotor and stationary component, particularly radial excursions of the rotor during start-up. At steady-state, the steam pressure overcomes the spring force and displaces the segments radially inwardly to a small clearance position relative to the rotor.

In an effort to avoid possible hang-up or binding of the seal segments due to uneven friction forces and potentially open up large leakage gaps in comparison with the more conventional fixed or spring backed positive pressure packing ring segments, another form of a variable clearance packing ring seal between stationary and rotating components has been proposed which uses thermal expansion characteristics of the various elements to enable a large seal clearance between the packing ring segment sealing face and the rotating component at start-up, while ensuring a small clearance and minimal inter-segment leakage therebetween at steady-state operation. (See U.S. patent application Ser. No. 09/060,902, filed Apr. 15, 1998, of common assignee herewith). In that application, there is provided a packing ring segment having a lower coefficient of thermal expansion than a seal holder, i.e., the stationary component, typically a turbine diaphragm or packing casing. Also provided is a centering ring having a greater coefficient of thermal expansion than the seal holder. A pair of centering rings are provided on axially opposite sides of the neck of the sealing segments and are supported by the stationary component, for example, by reroundable dowels affixed to the seal holder and projecting in an axial direction into the dovetail cavity. The packing ring segment is supported by the centering rings and each segment is biased radially inwardly by springs acting between the segments and the stationary component. The packing ring segments engage contact surfaces on the opposite ends of the centering rings to maintain a large clearance position at start-up between the seal faces of the segments and the rotary component. In that position, the segment ends are closed.

The centering rings have a greater coefficient of thermal expansion than the seal holder, rotor and packing ring segments. After start-up and as the temperature rises, the centering rings thermally expand in a circumferential direction to a greater extent than the packing ring segment. The contact surfaces, forming the support points for the packing ring segment on the centering rings, are therefore shifted circumferentially to enable the packing ring segment to be displaced radially inwardly. As the machine reaches steady-state operation, the packing ring segments engage the outer surface of uniform diameter of the centering rings, thus assuring concentricity of the packing ring segment sealing surfaces relative to the rotary component, enabling a small uniform clearance between the sealing faces of the segments and the rotary component and opening end gaps between the seal segments. The result is a uniform clearance seal that retains its labyrinth tooth geometry during start-up and a steady-state operation and has minimal bias leakage.

BRIEF SUMMARY OF THE INVENTION

According to the present invention, there is provided combined labyrinth/brush seal packing ring segments which are positively biased for movement between large seal clearance start-up and small seal clearance steady-state operating positions about a rotary component. Any form of bias may be applied to the packing ring segments of the present invention to move the packing ring segments between the large clearance start-up position and the small clearance operating position such as, for example, the specifically described positive pressure packing ring segments and thermally activated packing ring segments herein. When employing brush seals in combination with the labyrinth seals in the positively biased packing ring segments hereof, the advantages of providing a large clearance seal at start-up to avoid rubs and vibration problems at start-up, as well as to provide cooling flow along the seal, are combined with the advantages of a brush seal as the primary seal in the packing ring segments. The brush seal at start-up is spaced from the rotor and, hence, does not contribute to rotor vibrations due to contact and generation of heat by such contact. At steady-state operating conditions, the brush seal may be spaced slightly from the rotor or lie in contact with the rotor to afford a primary effective seal between the stationary and rotary components. While steam turbines have been outfitted with brush seals at interstage and end packing locations previously, the combination of labyrinth/brush seals in a movable positively biased packing ring segment has heretofore, to applicants' knowledge, yet been demonstrated.

In a preferred embodiment according to the present invention, there is provided in a steam turbine having a component rotatable about an axis and a stationary component about the axis having at least one axially extending locating hook, a movable packing ring assembly comprising a plurality of packing ring segments about the axis, the segments having arcuate seal surfaces in opposition to the rotatable component and carrying a brush seal having tips thereof radially inwardly of the surface, each segment having at least a first arcuate flange extending in an axial direction, a spring between the locating hook and the flange for biasing each segment for movement in a radial outward direction locating the brush seal tips in first positions spaced from the rotary component and a chamber between the stationary component and the segment for displacing the segment radially inwardly against the bias of the springs to locate the bristle tips radially inwardly of the first positions thereof.

In a further preferred embodiment according to the present invention, there is provided for use in a machine having a component rotatable about an axis, a stationary component about the axis, and supports carried by the stationary component about the axis, a variable clearance packing ring comprising a packing ring segment about the axis, the segment having an arcuate seal face in opposition to the rotatable component, at least a first arcuate flange extending in an axial direction and a brush seal extending from the arcuate seal surface toward the rotatable component and having a plate on at least one side thereof, an element engageable by one of the supports and engaging the first flange at a first location therealong for maintaining the segment seal face and brush seal in a first clearance position relative to the rotating component, the element having a coefficient of thermal expansion greater than a coefficient of thermal expansion of the segment, the element engaging the first flange at a second location therealong in response to relative thermal expansion of the segment and the element, enabling the segment for displacement radially inwardly relative to the element to locate the seal face and the brush seal in a second clearance position relative to the rotating component and radially inwardly of the first clearance position.

In a still further preferred embodiment according to the present invention, there is provided for use in a machine having a component rotatable about an axis, a stationary component about the axis, and a support carried by the stationary component about the axis, a variable clearance packing ring comprising a packing ring segment about the axis, the segment having an arcuate seal face in opposition to the rotatable component and a brush seal extending from the arcuate seal face toward the rotatable component, an element engageable by the support and engaging the segment at a first location therealong for maintaining the segment seal face and the brush seal in a first clearance position relative to the rotating component, the element having a coefficient of thermal expansion greater than a coefficient of thermal expansion of the segment, the element engaging the segment at a second location therealong in response to relative thermal expansion of the segment and the element, enabling the segment for displacement radially inwardly relative to the element to locate the seal face in a second clearance position relative to the rotating component and radially inwardly of the first clearance position.

Accordingly, it is a primary object of the present invention to provide, in a turbine, novel and improved combined labyrinth/brush seal packing ring segments positively biased for movement between large and small clearance positions at start-up and steady-state, respectively.

BRIEF DESCRIPTION OF THE DRAWINGS

FIG. 1 is a fragmentary cross-sectional view illustrating a plurality of packing ring seal segments between a stationary and rotary component according to the prior art;

FIGS. 2 and 2A are cross-sectional views of a combined labyrinth/brush seal positive pressure packing ring segment according to the present invention in respective large and small clearance portions relative to the rotary component;

FIGS. 3 and 3A are fragmentary axial cross-sectional views thereof, respectively, in the large and small clearance positions;

FIG. 6A and 6B are fragmentary cross-sectional views taken generally about on lines 6A—6A and 6B—6B in FIGS. 5A and 5B, respectively.

DETAILED DESCRIPTION OF THE INVENTION

Figure 4A:
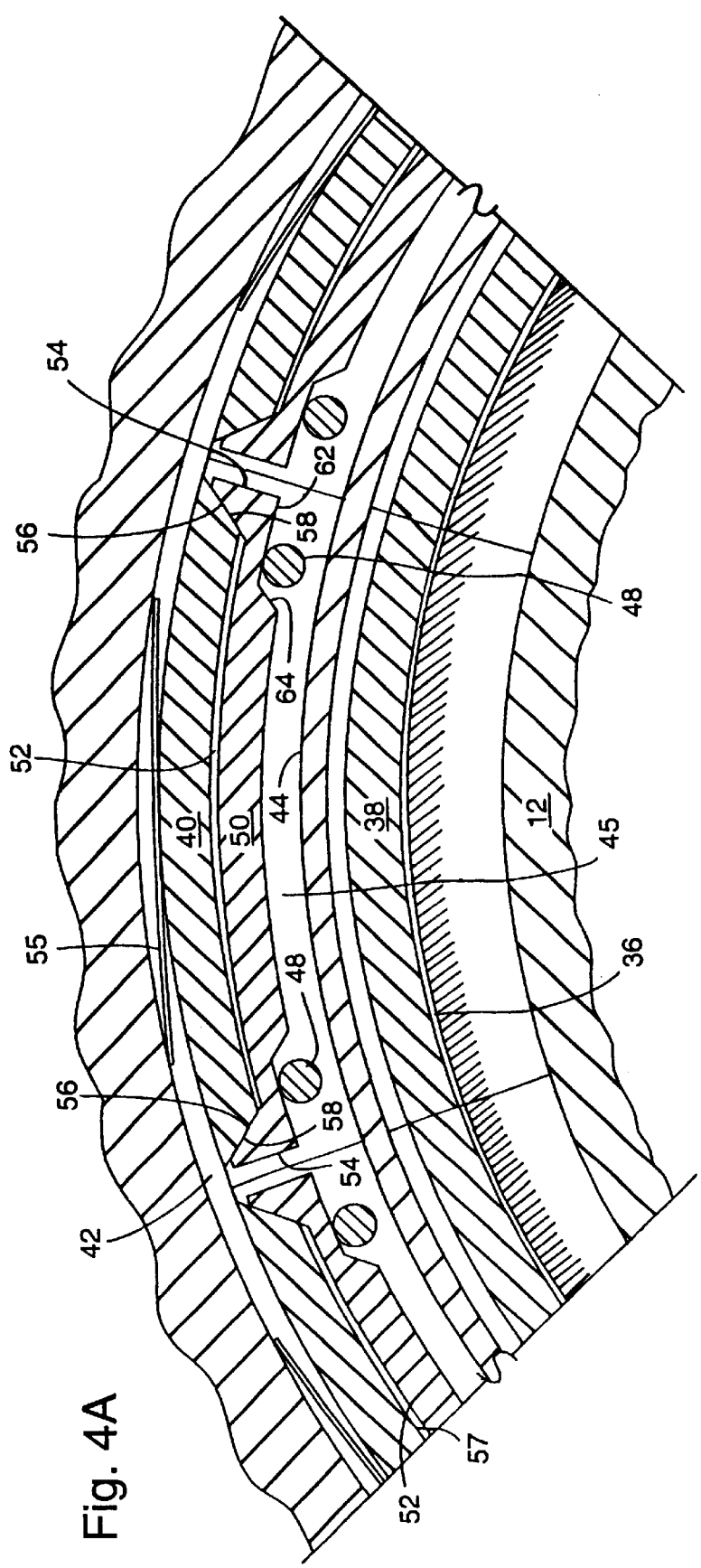
FIG. 4A is a fragmentary axial cross-sectional view illustrating a further embodiment of a combined labyrinth/brush seal packing ring segment according to the present invention in a large clearance position.

Referring now to the prior art of FIG. 1, there is illustrated a portion of a steam turbine, generally designated 10, having a turbine shaft 12 disposed in a turbine housing 14 and which shaft 12 is supported for rotation by conventional means, not shown, within housing 14. A multi-stage labyrinth seal 16 includes a plurality of seal rings 18, 20 and 22 disposed about turbine shaft 12, the seal rings separating high and low pressure regions 28 and 30, respectively. Each seal ring is formed of an annular array of a plurality of arcuate seal segments 32. In general, this conventional labyrinth seal 16 functions by placing a relatively large number of partial barriers to the flow of steam from the high pressure region 28 to the low pressure region 30. Each barrier forces steam attempting to flow parallel to the axis of turbine shaft 12 to follow a tortuous path whereby a pressure drop is created. The sum of all the pressure drops in the labyrinth seal 16 is, by definition, the pressure difference between the high and low pressure regions 28 and 30.

Still referring to FIG. 1, each arcuate seal ring segment 32 has a sealing face 34 and radially projecting teeth 36, each sealing face 34 being formed by a pair of flanges 38 extending axially away from one another. The radially outer portions of the seal ring segments 32 include first arcuate locating flanges or hooks 40 which similarly extend from segment 32 in axially opposite directions away from one another. The turbine housing 14 includes a generally dovetail-shaped annular groove 42 defined along radially innermost portions by a pair of locating flanges 44 which extend axially toward one another defining a slot 46 therebetween. An axially reduced neck 45 (FIG. 2) extends between the locating flanges 40 and seal flanges 38 and in the slot 46 between flanges 44.

Referring to FIGS. 2 and 3 and in one aspect of the present invention, there is provided a combined labyrinth/brush seal positive pressure packing ring segment similar in general configuration as the packing ring segments 32 illustrated in FIG. 1. That is, each packing ring segment of FIGS. 2 and 3 includes a sealing face 34, radially projecting tapered labyrinth teeth 36 spaced axially from one another, a pair of flanges 38 extending axially in opposite directions, arcuate locating flanges or hooks 40 which extend in axially opposite directions away from one another and a neck 45 between the locating flanges 40 and seal flanges 38. Similarly, the stationary component of the turbine housing includes a dovetail-shaped annular groove 42 having a pair of locating flanges 44 extending axially toward one another defining a slot 46 therebetween. In this form, however, the seal ring segment constitutes a positive pressure packing ring segment movable between a large clearance position with the rotor 16 at start-up and a small clearance position during steady-state operation of the turbine. To accomplish this, one or more pairs of springs 31 are located between the locating flanges 44 of the stationary component and the locating hooks 40 of the seal ring segment to bias the seal ring segment radially outwardly into the large clearance position. Consequently, the labyrinth teeth 36 are maintained spaced from the rotor at start-up. Additionally, the chamber 33 defined by the annular groove 42 and the radially outermost surface of the segment 32 may receive high pressure fluid, for example, via a passage 35 in the stationary component. It will be appreciated that the high pressure fluid may be supplied to the chamber in a number of different ways including by forming grooves along the upstream or high pressure side of the seal segment itself, communicating the high pressure fluid on the upstream side to the chamber 33. By pressurizing the chamber 33, the fluid pressure overcomes the bias of the springs 31, displacing the seal segment radially inwardly toward the rotor to establish a small clearance, steady-state operating condition.

Further, in the present invention, the sealing segment has a brush seal, generally designated 37. Brush seal 37 includes a plurality of metal bristles 53 disposed between a pair of plates 41 and 43. The brush seal 37 is disposed in a groove 47 disposed in the sealing face 34 of the sealing segment. One of the plates 43 has a hook 49 received in a complementary recess 51 of the segment for retaining the brush seal in the segment. It will be appreciated that the bristles 53 at their radially outermost ends may be welded to one another and to the plates. The bristles 53 have tips 39 which project beyond the radially innermost edges of the plates 41 and 43 to establish with the labyrinth teeth 36 a combined labyrinth/brush seal sealing segment.

In the start-up condition, the sealing segments are disposed in a large clearance, radially outward position under the bias of the leaf springs 31, spacing the labyrinth teeth and the tips 39 of the brush seal from the rotor 16. Consequently, at start-up, there is no rubbing contact whatsoever between the seal and the rotor which facilitates the elimination of vibration, as well as heat build-up in the seal. At steady-state operation, the fluid pressure provided chamber 33 via conduit 35 overcomes the bias of the springs 31 and displaces the sealing segments radially inwardly into a small clearance position. In that position, the brush seal forms the primary seal with the rotor. It will be appreciated that the brush seal in the small clearance position may be spaced from the rotor to provide a clearance, i.e., a non-rubbing, non-contacting relation with the rotor or the brush seal tips 39 may engage the rotor to provide a rubbing contact. The brush seal 37 may comprise a conventional type of brush seal and preferably has the bristles extending at a cant angle in the direction of rotation of the rotor.

Figure 4B:
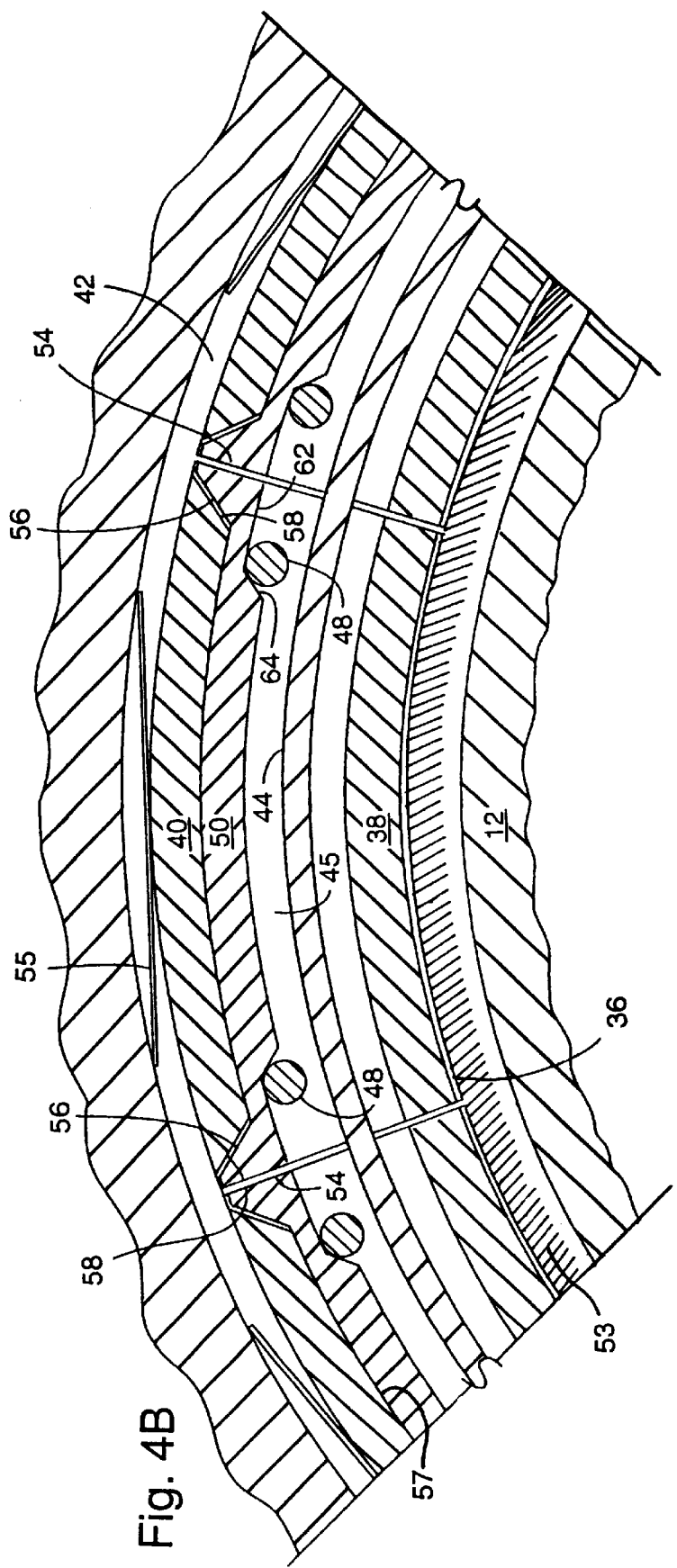
FIG. 4B is a view similar to FIG. 4A illustrating the combined labyrinth/brush seal packing ring seal segment in a small clearance position.
Figure 5B:
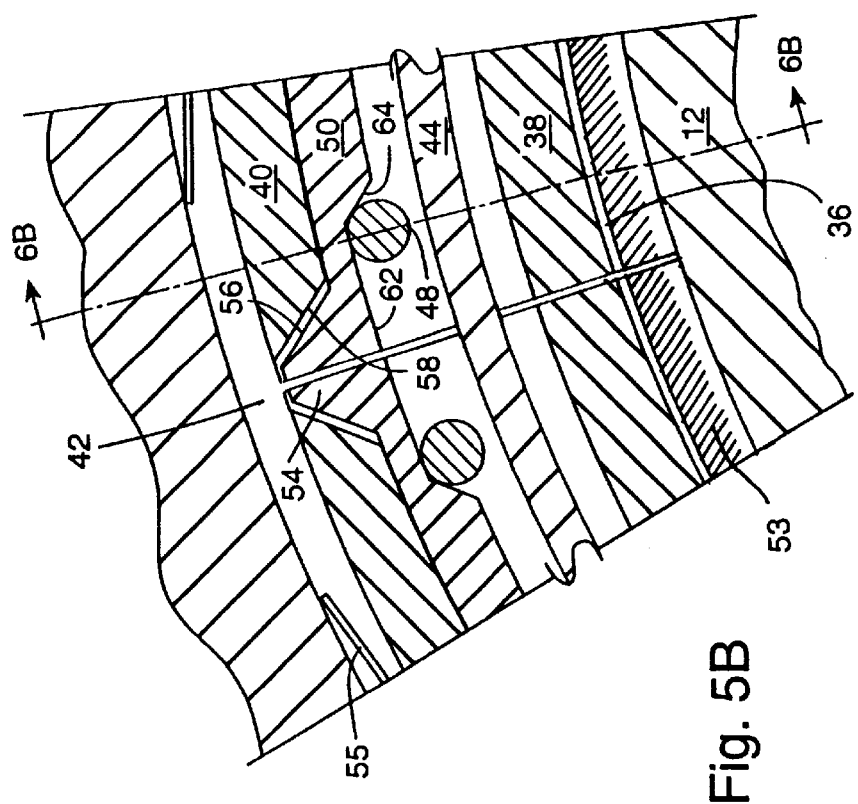
FIGS. 5A and 5B are enlarged fragmentary cross-sectional views illustrating the ends of the packing ring segments and supports therefor of FIGS. 4A and 4B in the large and small clearance positions, respectively.
Figure 5A:
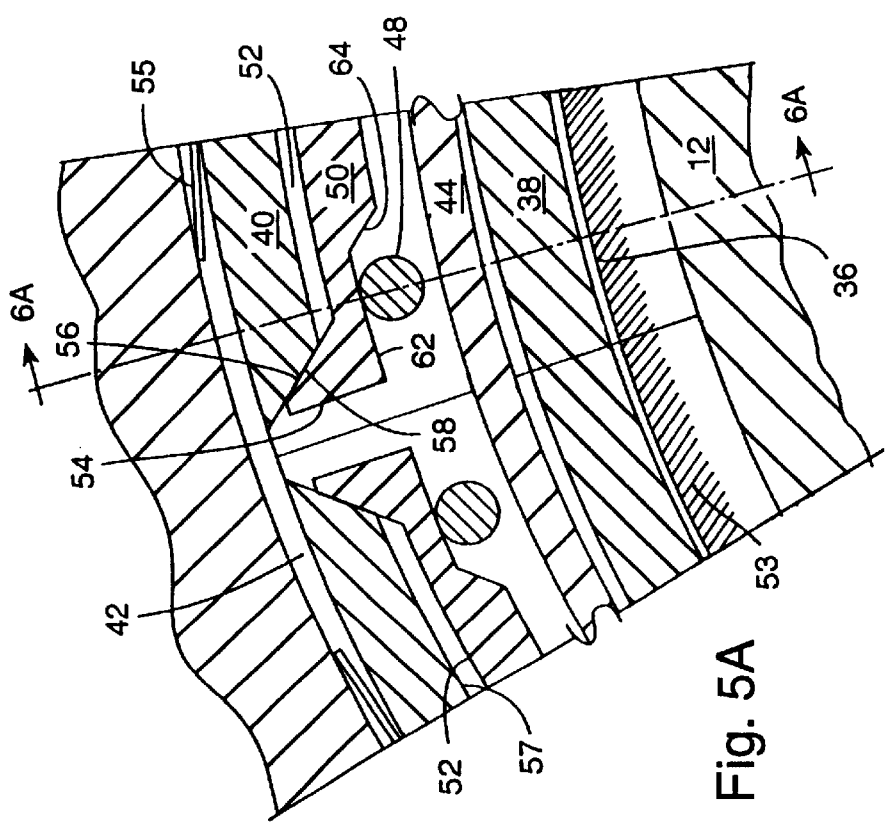

Referring now to the embodiment of the invention illustrated in FIGS. 4–6, a similar seal segment having a combined labyrinth/brush seal in a positively biased sealing segment is provided. Thus, the segment includes, similarly as in the previous embodiment, a brush seal 37 having bristles 53 extending at a cant angle between plates 41 and 43, the brush seal 37 being retained in a groove in the brush seal segment by the lateral projection 49 in complementary recess 51. In this form, however, the seal segment is maintained in a large clearance position by temperature-responsive centering rings 50 biased to a small clearance position by springs 55.

More specifically, a plurality of packing ring segment supports 48 are disposed in the cavity 42 between the locating flanges 38 and 44 of the segments 32 and housing 14, respectively. The supports may comprise dowels 48 at circumferentially spaced positions along the cavity 42. A centering ring or element 50 is provided in the cavity 42 between the dowels of the seal holder and the locating flange 38 on each axial side of the neck. The centering rings 50 have a circumferential extent comparable to the circumferential extent of the packing ring segments and a uniform diameter radially outer surface 52. It will be appreciated that the undersides 57 of the locating flanges or hooks 40 also have a uniform diameter radially inner surface for mating with the surface 52.

As illustrated, the opposite ends of each centering ring 50 have radial outward projections 54 with a canted contact surface 56. The canted contact surface 56 may be linear, convexly arcuate or may comprise a contact area or point. Each of the opposing end surfaces of each locating flange 38 has a contact surface 58 engaging the contact surface 56 in the large clearance position of the seal segment relative to the rotor. The radially innermost surface of the centering ring 50 at its opposite ends is inset or recessed such that the centering ring 50 rests on dowels 48 along recessed surfaces 62. The centering ring 50 also has canted surfaces 64 for engaging the dowels to prevent the centering ring from displacement in a circumferential direction relative to the segment. It will be appreciated that, with the springs 55 biasing the packing ring segments radially inwardly, the contact surfaces 58 on the locating flanges 38 engage the contact surfaces 56 on the centering rings 50. The centering rings, in turn, are supported by the engagement between the dowels 48 and recessed surfaces 62. With that arrangement and with the various machine elements being cold, i.e., at start-up, each packing ring segment about rotor 12 is maintained in a large clearance position relative to rotor 12. Note the radial gap (FIG. 4A) between the radial inner surfaces 57 of the locating flanges 40 and the outer surfaces 52 of the centering rings 50.

The centering rings 50 are formed of material having a coefficient of thermal expansion greater than the coefficient of thermal expansion of the sealing ring segments, the seal holder, i.e., the housing 14, and the rotor 12. Thus, any material which has a higher coefficient than the coefficient of the adjoining elements may be used as the material for the centering ring consistent with the expansion required for operation and at the temperatures of the machine. As a specific example, the packing ring segment may be formed of 409 Stainless Steel or Invar (nickel iron alloy) while the centering rings may be formed of 304 Stainless Steel. Also, as illustrated in FIG. 3A, the packing ring segments at their adjoining ends in the large clearance positions thereof provide a substantial gap therebetween.

After start-up, and as the temperature of the working fluid rises, the various elements react dimensionally differently relative to one another and enable the packing ring segments to be displaced from the large clearance to the small clearance positions, increasing slightly the gap between adjacent ends of the packing seal ring segments. To accomplish that, as the parts are heated by the working fluid, the centering rings 50 will expand in a circumferential direction, i.e., grow thermally in the circumferential direction to a greater extent than the circumferential growth of the packing ring segment. As the centering rings expand circumferentially, the contact surfaces 56 at the ends of the centering rings are displaced circumferentially away from the contact surfaces 58, enabling the springs 55 to displace the packing ring segments including the combined labyrinth/brush seal radially inwardly such that the surfaces 52 and 57 may engage one another. Note that the radial position of each centering ring remains the same during the thermal expansion, i.e., at the cold start and at the steady-state operating condition. With the displacements of the segments radially inwardly, the seal surfaces of the segments and brush seal tips are displaced closer to the rotary component to the small clearance position illustrated in FIG. 4B. Concurrently, the end gaps between the seal ring segments and increase slightly to the desired running clearance. With the surfaces 52 and the under surfaces 57 of the locating flange 40 concentric with one another, a uniform small clearance concentrically about the rotor is achieved.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. For use in a machine having a component rotatable about an axis, a stationary component about said axis, and supports carried by said stationary component about said axis, a variable clearance packing ring comprising:
   a packing ring segment about said axis, said segment having an arcuate seal face in opposition to the rotatable component, at least a first arcuate flange extending in an axial direction and a brush seal extending from said arcuate seal surface toward said rotatable component and having a plate on at least one side thereof;
   an element engageable by one of the supports and engaging said first flange at a first location therealong for maintaining said segment seal face and brush seal in a first clearance position relative to the rotating component;
   said element having a coefficient of thermal expansion greater than a coefficient of thermal expansion of said segment, said element engaging said first flange at a second location therealong in response to relative thermal expansion of said segment and said element, enabling said segment for displacement radially inwardly relative to said element to locate said seal face and said brush seal in a second clearance position relative to the rotating component and radially inwardly of said first clearance position.

2. A packing ring according to claim 1 wherein said element has a generally radially outwardly projecting surface engaging at said first location a generally radially directed surface of said flange in said first clearance position relative to the rotating component, said radially outwardly projecting surface of said element disengaging said surface of said flange in response to thermal expansion of said element relative to said segment.

3. A packing ring according to claim 1 wherein said element is arcuate and has at least one circumferentially extending surface for engaging said one flange in said second clearance position of said segment and maintaining said segment concentrically about said axis.

4. A packing ring according to claim 3 wherein said one flange has a circumferentially extending surface, said circumferentially extending surfaces engaging one another in the second clearance position of said segment relative to the rotating component.

5. A packing ring according to claim 1 wherein said element has a generally radially outwardly projecting surface engaging at said first location a generally radially directed surface of said flange in said first clearance position relative to the rotating component, said radially outwardly projecting surface of said element disengaging said surface of said flange in response to thermal expansion of said element relative to said segment, said element being arcuate and having at least one circumferentially extending surface for engaging said one flange in said second clearance position of said segment and maintaining said segment concentrically about said axis.

6. A packing ring according to claim 1 wherein said segment has a second arcuate flange extending in an axial direction on a side thereof opposite said first flange and a neck between said first and second flanges and said seal face, a second element carried by another of the supports engaging said second flange at a first location therealong to maintain said segment seal face in said first clearance position relative to the rotating component, said second element having a coefficient of thermal expansion greater than the coefficient of thermal expansion of said segment, said second element engaging said second flange at a second location therealong in response to relative thermal expansion of said segment and said second element, enabling said segment for displacement radially inwardly relative to said second element.

7. A packing ring according to claim 1 in combination with said stationary component, said stationary component having a slot for receiving said segment, a first pair of said supports projecting axially into said slot between said first arcuate flange and said seal face, said element being carried by said supports adjacent opposite ends thereof, and abutments carried by said element engageable with said supports for preventing displacement of said element in a circumferential direction.

8. The combination of claim 7 wherein said stationary component has a generally dovetail-shaped slot for receiving said segment, said segment having a second arcuate flange extending in an axial direction on a side thereof opposite said first flange and a neck between said first and second flanges and said seal face, a second element carried by a second pair of supports engaging said second flange at a first location therealong to maintain said segment seal face in said first clearance position relative to the rotating component, said second element having a coefficient of thermal expansion greater than the coefficient of thermal expansion of said segment, said second element engaging said second flange at a second location therealong in response to relative thermal expansion of said segment and said second element, enabling said segment for displacement radially inwardly relative to said second element, said first and second pairs of supports projecting axially into said slot between said first and second arcuate flanges and said seal face, said first and second elements being carried by said first and second pairs of supports respectively adjacent opposite ends of said elements, and abutments engageable with said supports for preventing displacement of said elements in a circumferential direction.

9. The combination of claim 8 including a spring cooperable between said stationary component and said segment biasing said segment for radial inward movement.

10. For use in a machine having a component rotatable about an axis, a stationary component about said axis, and a support carried by said stationary component about said axis, a variable clearance packing ring comprising:

a packing ring segment about said axis, said segment having an arcuate seal face in opposition to the rotatable component and a brush seal extending from said arcuate seal face toward said rotatable component;

an element engageable by the support and engaging said segment at a first location therealong for maintaining said segment seal face and said brush seal in a first clearance position relative to the rotating component;

said element having a coefficient of thermal expansion greater than a coefficient of thermal expansion of said segment, said element engaging said segment at a second location therealong in response to relative thermal expansion of said segment and said element, enabling said segment for displacement radially inwardly relative to said element to locate said seal face in a second clearance position relative to the rotating component and radially inwardly of said first clearance position.

11. A packing ring according to claim 10 wherein said element is arcuate and has at least one circumferentially extending surface for engaging said segment in said second clearance position thereof and maintaining said segment concentrically about said axis.

12. A packing ring according to claim 11 wherein said segment has a circumferentially extending surface, said circumferentially extending surfaces engaging one another in the second clearance position of said segment relative to the rotating component.

13. A packing ring according to claim 10 in combination with said stationary component, said stationary component having a slot for receiving said segment, a first pair of said supports projecting axially into said slot into engagement with said segment, said element being carried by said supports, and abutments carried by said element engageable with said supports for preventing displacement of said element in a circumferential direction.

* * * * *